United States Patent
Jain

(10) Patent No.: US 11,816,204 B2
(45) Date of Patent: *Nov. 14, 2023

(54) MULTI-TENANT ACTOR SYSTEMS WITH WEB ASSEMBLY

(71) Applicant: SAP SE, Walldorf (DE)

(72) Inventor: Shashank Mohan Jain, Kamataka (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,965

(22) Filed: Feb. 3, 2022

(65) Prior Publication Data
US 2022/0156363 A1 May 19, 2022

Related U.S. Application Data

(63) Continuation of application No. 16/576,009, filed on Sep. 19, 2019, now Pat. No. 11,275,827.

(51) Int. Cl.
| | |
|---|---|
| *G06F 21/53* | (2013.01) |
| *G06F 21/12* | (2013.01) |
| *G06F 9/54* | (2006.01) |
| *G06F 21/00* | (2013.01) |
| *G06F 9/48* | (2006.01) |
| *G06F 9/30* | (2018.01) |
| *G06F 16/957* | (2019.01) |
| *G06F 16/958* | (2019.01) |

(52) U.S. Cl.
CPC .......... *G06F 21/53* (2013.01); *G06F 9/3005* (2013.01); *G06F 9/4881* (2013.01); *G06F 9/547* (2013.01); *G06F 16/957* (2019.01); *G06F 16/958* (2019.01); *G06F 21/00* (2013.01); *G06F 21/128* (2013.01); *G06F 2209/5011* (2013.01)

(58) Field of Classification Search
None
See application file for complete search history.

(56) References Cited

U.S. PATENT DOCUMENTS

2020/0310894 A1* 10/2020 Guida ................. G06F 9/546

OTHER PUBLICATIONS

Haas, et al., "Bringing the Web up to Speed with WebAssembly", Jun. 2017, ACM, pp. 185-200. (Year: 2017).*
Takahashi et al., "Enabling Secure Multitenancy in Cloud Computing: Challengese and Approaches", Apr. 2012, IEEE, pp. 72-79. (Year: 2012).*

* cited by examiner

*Primary Examiner* — Qing Yuan Wu
(74) *Attorney, Agent, or Firm* — Buckley, Maschoff & Talwalkar LLC

(57) ABSTRACT

Some embodiments may be associated with a cloud-based actor framework. A dispatcher platform may determine that a first tenant actor is to be created for a first tenant in connection with a workload associated with a plurality of tenant identifiers. The first tenant may be, for example, associated with a first tenant identifier. The dispatch platform may then select a first thread for the first tenant actor from a pool of available threads and spin a first web assembly module such that execution of the first web assembly module is associated with a first web assembly browser sandbox. The dispatcher platform can then securely create the first tenant actor within the first web assembly browser sandbox to execute the workflow for the first tenant identifier. Similarly, a second web assembly browser sandbox may execute a second tenant actor for a second tenant identifier.

20 Claims, 13 Drawing Sheets

MULTI-TENANT ACTOR SYSTEMS WITH WEB ASSEMBLY

CROSS-REFERENCE TO RELATED APPLICATION

The present application is a continuation of U.S. patent application Ser. No. 16/576,009 entitled "MULTI-TENANT ACTOR SYSTEMS WITH WEB ASSEMBLY" and filed on Sep. 19, 2019. The entire content of that application is incorporated herein by reference.

BACKGROUND

An enterprise may utilize applications or services executing in a cloud computing environment. For example, a business might utilize applications that execute at a data center to process purchase orders, human resources tasks, payroll functions, etc. In some cases, an "actor model" may be used to implement applications and services. For example, thousands of small programs (e.g., universal primitives of concurrent computation) may work together to process a workload. In response to a message that it receives, an actor might, for example, make local decisions, create more another actor, send a message, determine how to respond to a subsequent message, etc. Actors may modify their own private state, but should only alter each other indirectly through messaging. Note that cloud-based computing environment might want to support multiple tenants (e.g., associated with different enterprises). With some implementations of the actor model, however, different actors may share memory, such as a shared Java heap. As a result, any flaw within a single tenant's runtime might be exploited by an attacker and compromise the security of all tenants. It would therefore be desirable to provide multi-tenant support for a cloud-based actor computing environment in a secure, automatic, and accurate manner.

SUMMARY

Methods and systems may be associated with a cloud computing environment. A dispatcher platform may determine that a first tenant actor is to be created for a first tenant in connection with a workload associated with a plurality of tenant identifiers. The first tenant may be, for example, associated with a first tenant identifier. The dispatch platform may then select a first thread for the first tenant actor from a pool of available threads and spin a first web assembly module such that execution of the first web assembly module is associated with a first web assembly browser sandbox. The dispatcher platform can then securely create the first tenant actor within the first web assembly browser sandbox to execute the workflow for the first tenant identifier. Similarly, a second web assembly browser sandbox may execute a second tenant actor for a second tenant identifier.

Some embodiments comprise: means for determining that a first tenant actor is to be created for a first tenant in connection with a workload associated with a plurality of tenant identifiers, wherein the first tenant is associated with a first tenant identifier; means for selecting a first thread for the first tenant actor from a pool of available threads; means for spinning, by a dispatcher platform, a first web assembly module such that execution of the first web assembly module is associated with a first web assembly browser sandbox; and means for creating the first tenant actor within the first web assembly browser sandbox to execute the workflow for the first tenant identifier.

Some technical advantages of some embodiments disclosed herein are improved systems and methods to provide multi-tenant support for a cloud-based actor computing environment in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
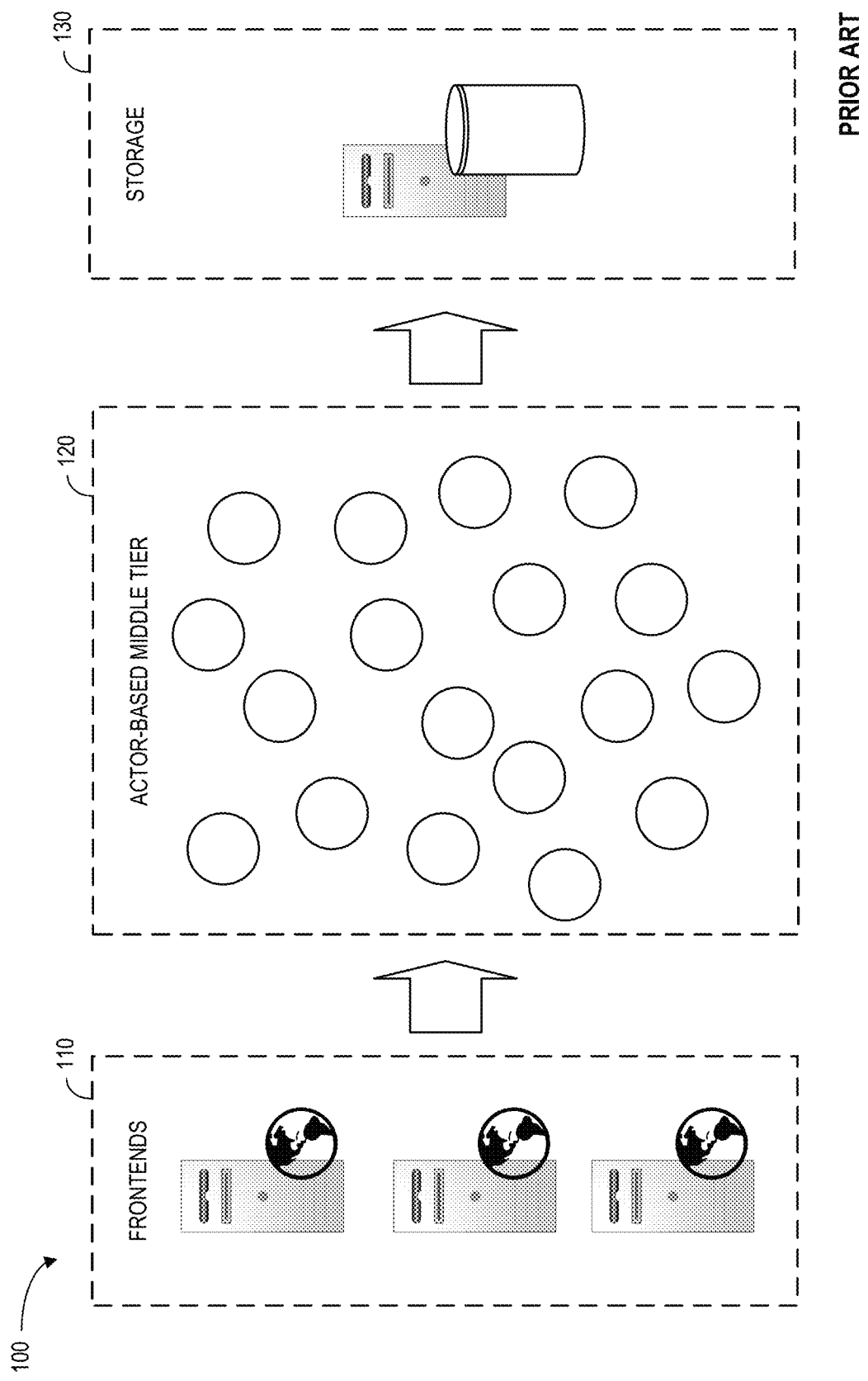
FIG. 1 is a high-level block diagram of an actor-based cloud computing system.

There is a growing use of actor systems to support concurrency for enterprises. The actor system was popularized by the Erlang programming language which was able to run millions of actors (light weight processes) within a Linux process. The actors work by exchanging messages in an asynchronous fashion and allow a small set of threads to run millions of such lightweight processes over a small set of Operating System (OS) threads. The erlang model was then taken up by Java world and the Akka framework was developed using the same actor model principles. Similarly, MICROSOFT® developed a framework called ORLEANS to implement the actor model. FIG. 1 is a high-level block diagram of an actor-based cloud computing system 100. In particular, an actor-based middle tier 120 may include thousands of actors and sit between frontends 110 and storage 130.

Note that cloud applications and services are inherently parallel, distributed, and dynamic (and may need near real time direct interactions among cloud entities). These types of applications can be difficult to build and may require expert level programmers and expensive iterations of the design as the workload grows. According to some embodiments, the middle tier 120 is stateful and various business logic entities appear as sea of isolated globally addressable .NET objects of different application defined types distributed across a cluster of servers. The objects may comprise instances of application-defined object classes that get created by runtime on servers on an as-needed basis to handle requests. The objects may map to application entities, such as users, devices, sessions, inventories, orders, etc. Note that each object may have a persistent state in storage and/or in-memory state. Runtime instantiates (or activates) objects when there is work for them to do, and removes objects from memory (or deactivates) to reclaim hardware resources when objects are idle for too long. According to some embodiments, the actors in the middle tier are "virtual actors" and physical instantiations of objects may be abstracted away (and automatically managed by the runtime). A virtual actor model may, for example, be more suitable for high-scale dynamic workloads like cloud services.

Actor systems support massive concurrency, but may not provide sufficient isolation to run a multi-tenanted workload. For example, Akka runs all actors within the same java heap. Any flaw within the runtime can be exploited by an attacker and completely compromise all the tenants running on top of the runtime. Similarly, a malicious actor can just write a simple code (e.g., "system.exit") that can terminate the complete Java Virtual Machine ("JVM") that is running the multi-tenanted workload.

Figure 2:
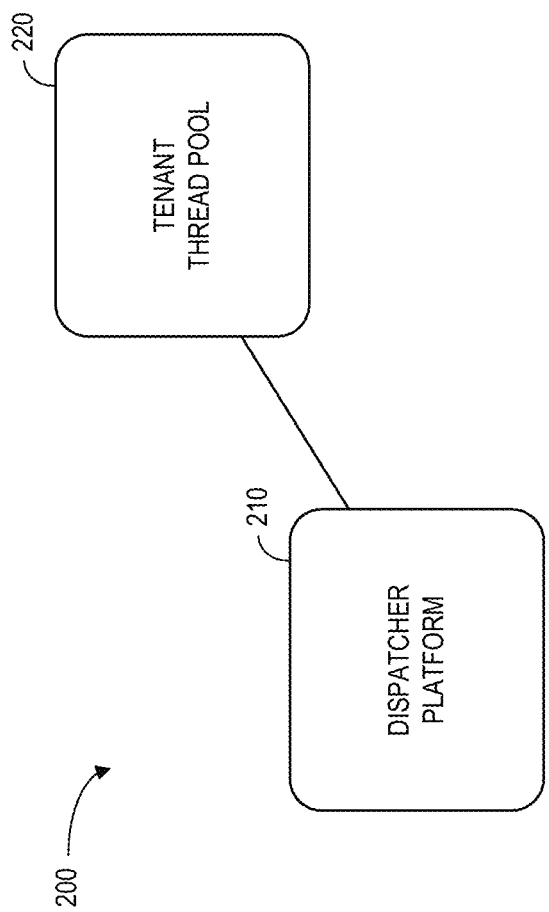
FIG. 2 is a high-level system architecture in accordance with some embodiments.

To provide improved multi-tenant support for a cloud-based actor computing environment in a secure, automatic, and accurate manner, FIG. 2 is a high-level system 200 architecture in accordance with some embodiments. The system 200 includes a dispatcher platform 210 and a tenant thread pool 220. As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The dispatcher platform 210 may store information into and/or retrieve information from various data stores, which may be locally stored or reside remote from the dispatcher platform 210. Although a single dispatcher platform 210 and tenant thread pool 220 are shown in FIG. 2, any number of such devices may be included. Moreover, various devices described herein might be combined according to embodiments of the present invention. For example, in some embodiments, the dispatcher platform 210 and the tenant thread pool 220 might comprise a single apparatus. The system 200 functions may be performed by a constellation of networked apparatuses, such as in a distributed processing or cloud-based architecture.

A user may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 200.

Figure 3:
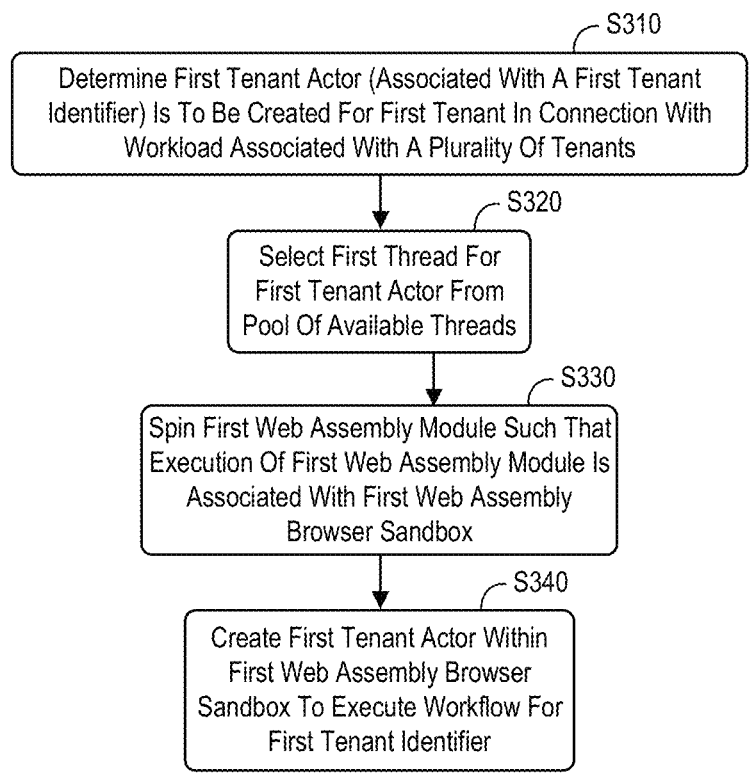
FIG. 3 is a method according to some embodiments.

FIG. 3 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, it may be determined that a first tenant actor is to be created for a first tenant in connection with a workload associated with a plurality of tenant identifiers. Moreover, the first tenant may be associated with a first tenant identifier. At S320, a first thread for the first tenant actor may be selected from a pool of available threads.

At S330, a dispatcher platform may create or "spin" a first web assembly module such that execution of the first web assembly module is associated with a first web assembly browser sandbox. Further details about the "web assembly" module are provided in connection with FIG. 4. According to some embodiments, the first web assembly browser sandbox is associated with a first memory heap that is not accessible from the second web assembly browser sandbox. At S340, the first tenant actor that then be created within the first web assembly browser sandbox to execute the workflow for the first tenant identifier. According to some embodiments, a system call from the first web assembly browser sandbox may be mediated and/or controlled. Moreover, control flow integrity for the first web assembly browser sandbox may be maintained by separating an execution stack from web assembly module memory. To further secure the system, access to a function for the first web assembly browser sandbox may be limited via an index into a function table.

Figure 4:
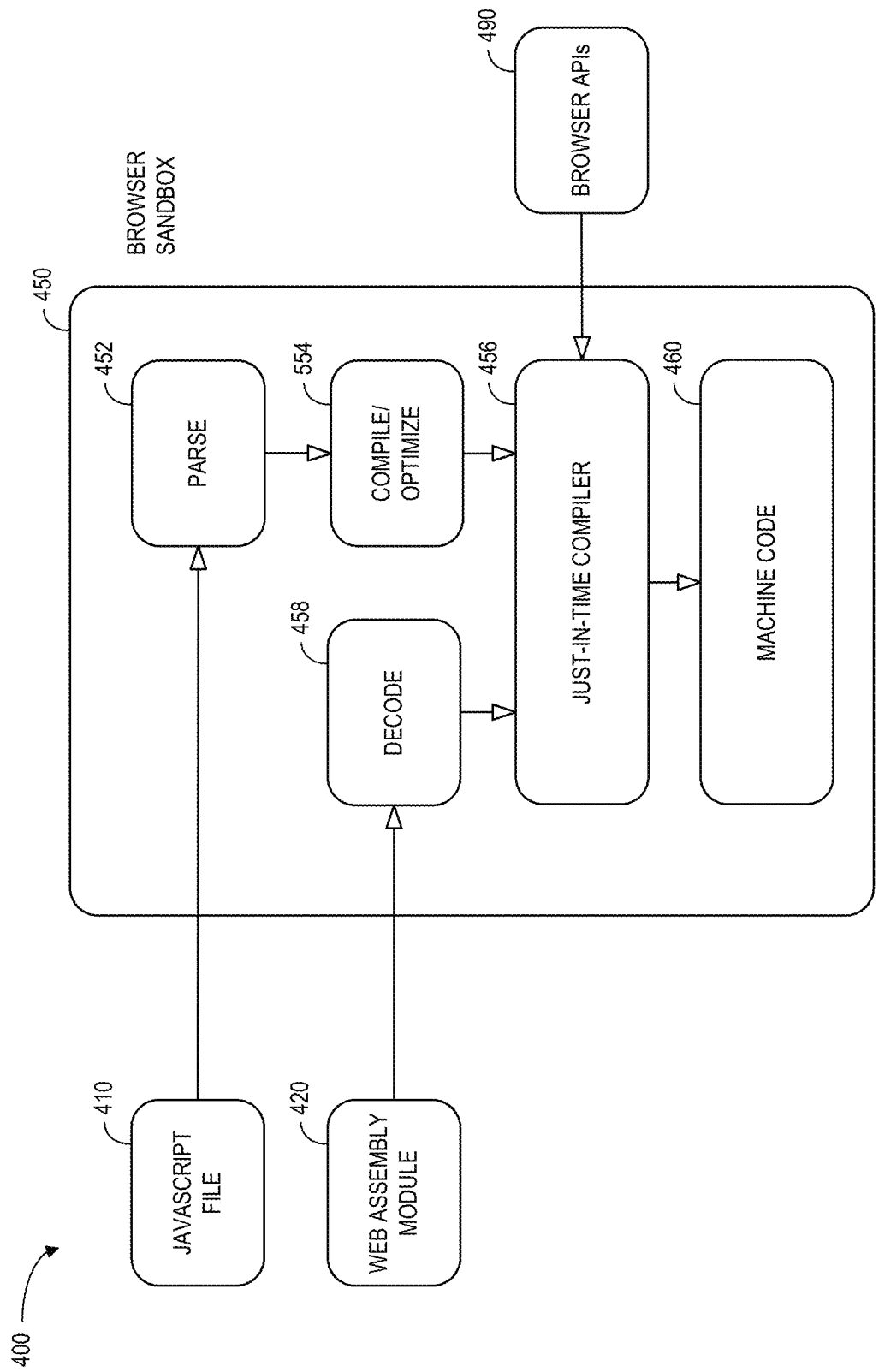
FIG. 4 is a high-level block diagram of web assembly system in accordance with some embodiments.

FIG. 4 is a high-level block diagram of "web assembly" system 400 in accordance with some embodiments. In particular, a browser sandbox 450 may execute a JavaScript file 410 and/or a web assembly module 420. For a JavaScript file 410, the browser sandbox 250 may utilize a parse element 452 and a compile/optimize element 254 before executing a Just-In-Tim ("JIT") compiler 456 (which may also receive browser Application Programming Interface ("API") data 490). For a web assembly module 420, the browser sandbox 450 may utilize a decode element 458 before executing the JIT compiler 456. In either case, the output of the JIT compiler may comprise machine code 460. According to some embodiments, the web assembly module 420 is a portable binary format designed to be: compact and fast to parse/load so it can be efficiently transferred, loaded, and executed by the browser; compatible with existing web platforms (e.g., to alongside JavaScript, allows calls to/from, access Browser APIs 490, etc.; and run in the same secure sandbox 450 as the JavaScript code 410. Note that higher-level languages can be compiled to a web assembly module 420 that is then run by the browser in the same sandboxed environment as the JavaScript code 410. Moreover, web assembly modules 420 compiled from higher-level languages may have been already parsed and compiled/optimized so they can go through a fast decoding phase (as the module is already in bytecode format close to machine code) before being injected into the JIT compiler 456. As a result, web assembly may represent a more efficient/faster way of running code in a browser, using any higher-level language that can target it for development, while being compatible with the existing web technologies.

According to some embodiments, a multi-tenanted workload uses web sandboxes for the actors running within the actor system. For example, an actor should not be able to break out of the sandbox and access the memory of other actors. An actor should have no access to the outside system by default and should only be enabled access on a case-by-case basis. Moreover, an actor should not have the ability to divert the control flow of the system.

Figure 5:
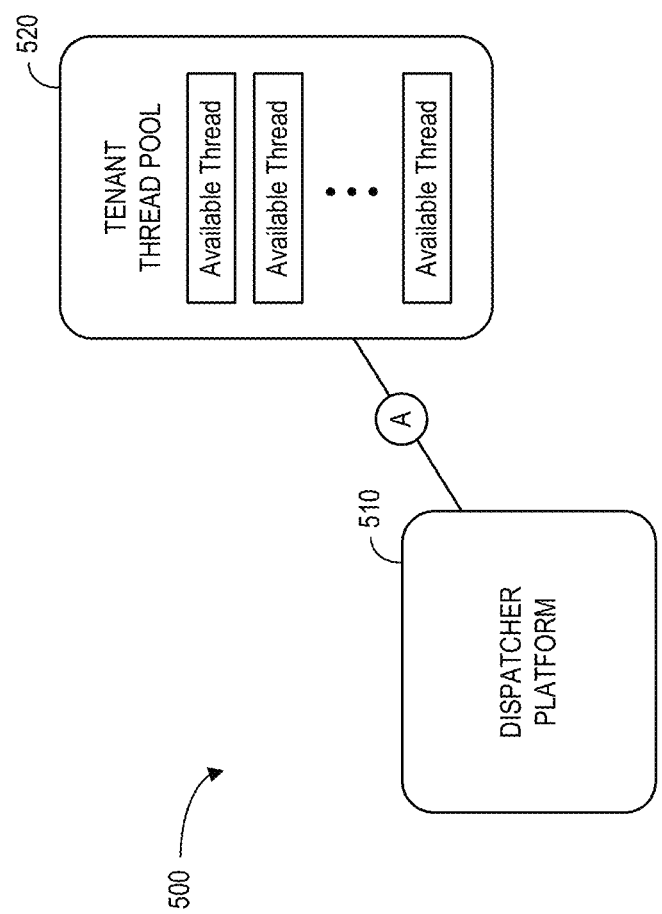
FIGS. 5 through 7 illustrate a tenant support process using web assembly according to some embodiments.
Figure 6:
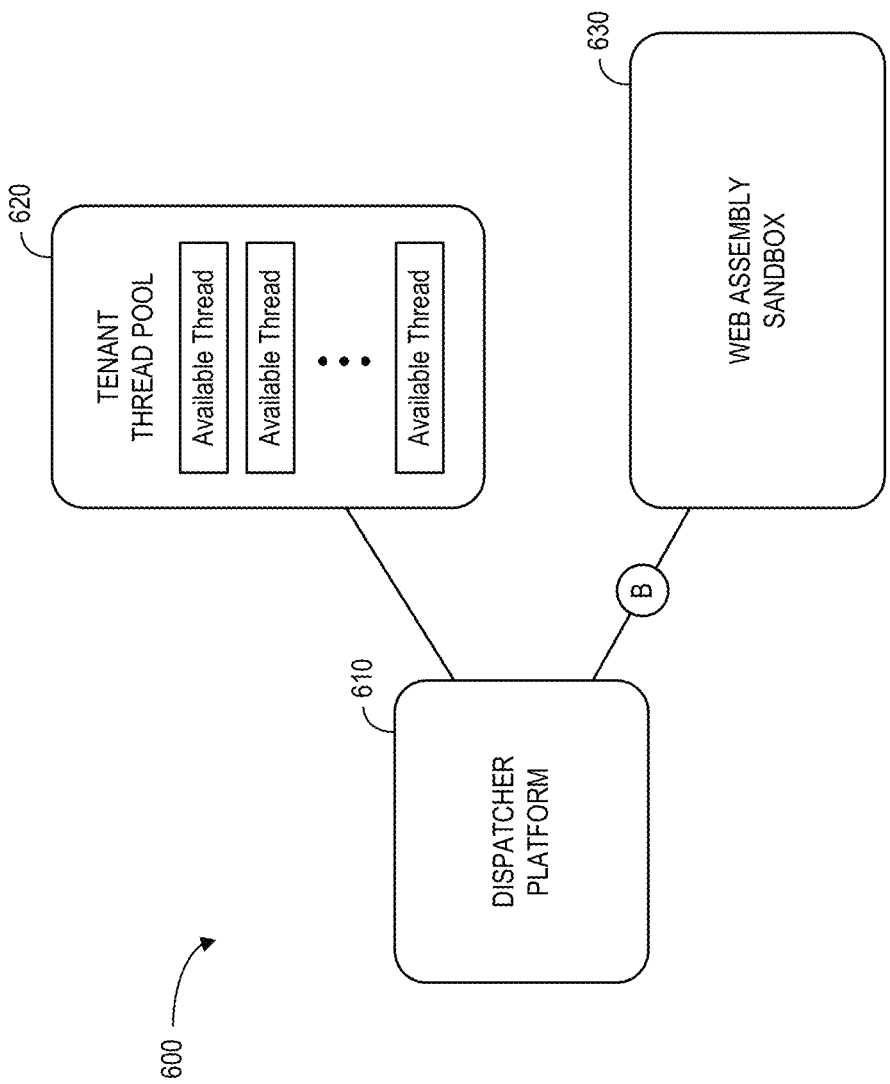
Figure 7:
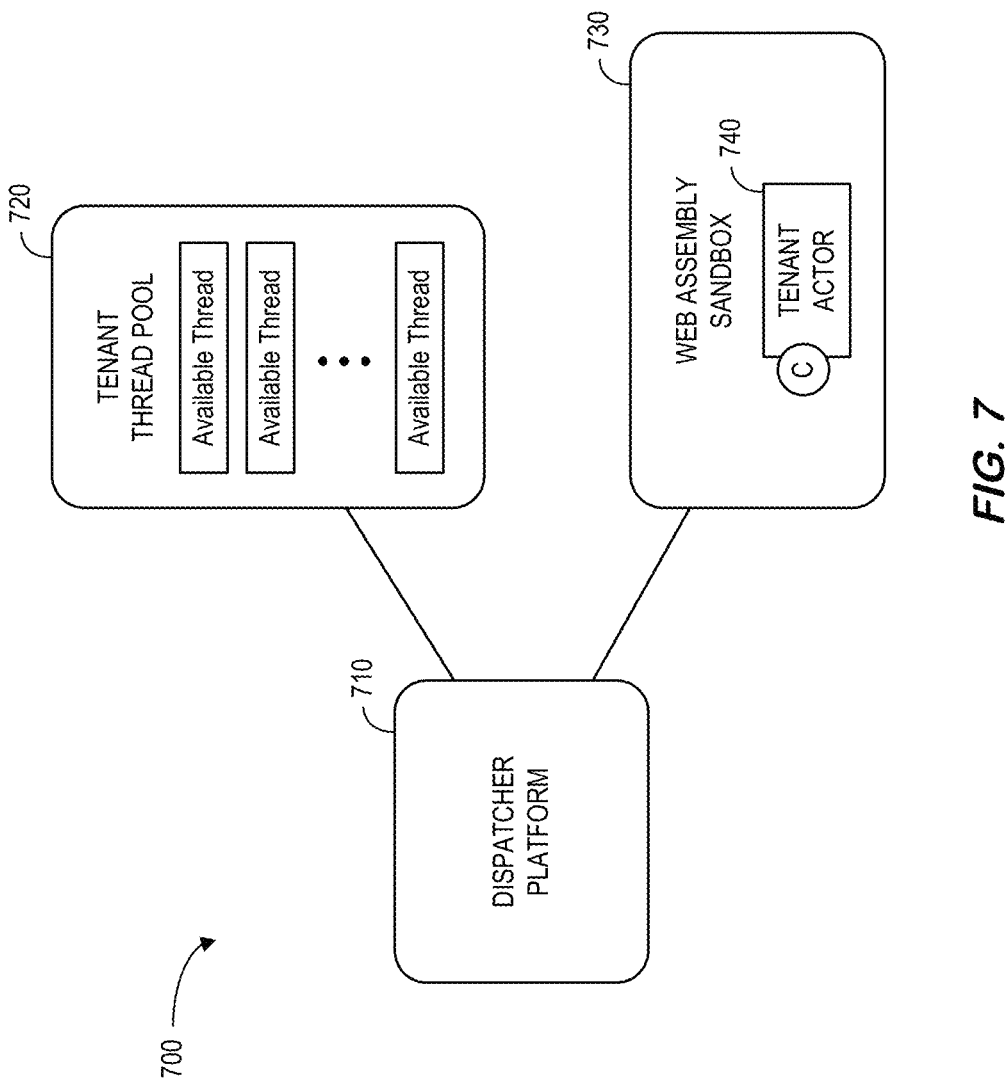

FIGS. 5 through 7 illustrate a tenant support process using web assembly according to some embodiments. In particular, FIG. 5 shows 500 a dispatcher platform 5150 selecting an available thread from a tenant thread pool 520 at (A). FIG. 6 illustrates 600 a dispatcher platform 610 creating a web assembly sandbox 630 at (B) (e.g., after selecting a thread from the tenant thread pool 620). Finally, FIG. 7 shows 700 how a dispatcher platform 710 can create a tenant actor 740 (using a thread selected from a tenant thread pool 720) in a web assembly sandbox 730 at (C) according to some embodiments. Whenever the tenant actor 740 has a message in its mailbox, it is scheduled on a thread from the tenant thread pool 720. Note that the execution of tenant actor 740 might in itself be a web assembly module. The result of such an approach may provide several benefits. For example:

1. The approach may isolate memory on a per actor basis. Each actor runs in its own web assembly module and therefor has its own heap and any access beyond that will lead to an error (only for that module).
2. The approach does not allow access outside of the system by default. Instead, only access to certain file descriptors is allowed (which also has mediated access). Such a technique is in line with capability-based security systems prevalent on Open Berkeley Software Distribution ("BSD") (also known as CAPSICUM) and the FUSCHIA OS available from GOOGLE®.
3. System calls can be mediated and controlled. For example, a system.exit system call will not even be exposed to the module.
4. Control flow integrity for the code may be maintained by separating an execution stack from the web assembly module memory. With a Linux process, on the other hand, the layout of the process might let the control flow be changed by manipulating the instruction pointer.
5. Access to functions directly might not be allowed (and the only access might be via an index into a function table).

Figure 8:
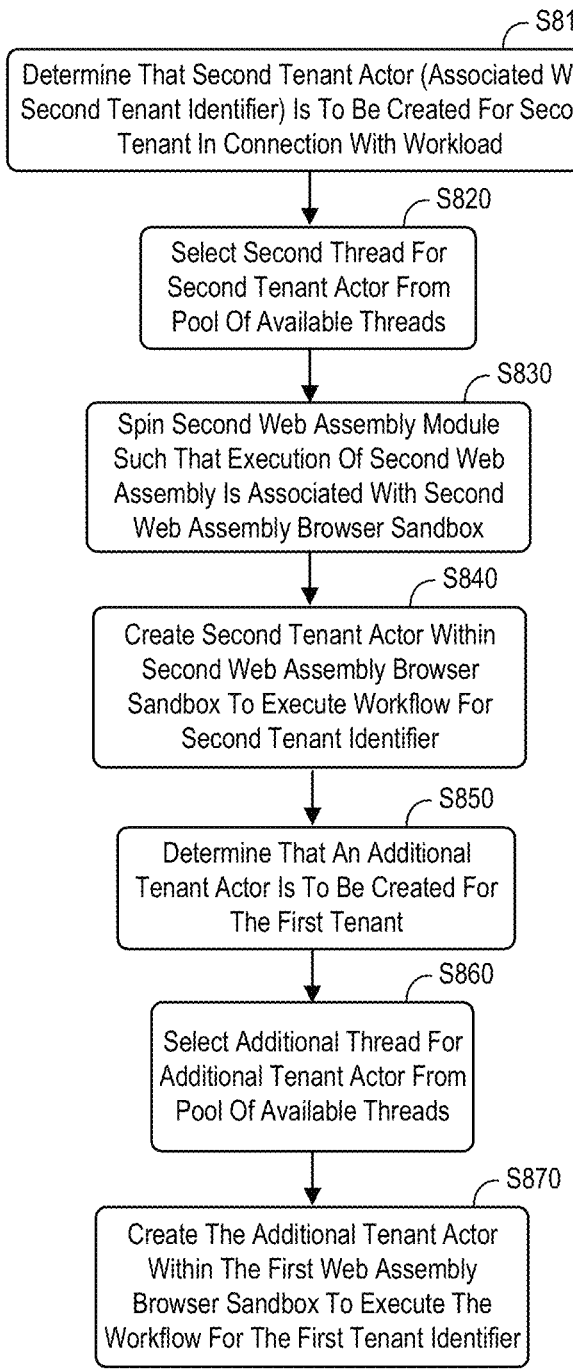
FIG. 8 illustrates a method associated with multiple actors and/or tenants in accordance with some embodiments.

These techniques may be used to support multiple tenant actors and/or multiple tenants. For example, FIG. 8 illustrates a method associated with multiple actors and/or tenants (e.g., after the method of FIG. 3 has been performed) in accordance with some embodiments. At S810, the system determines that a second tenant actor is to be created for a second tenant in connection with the workload. Moreover, the second tenant is associated with a second tenant identifier. At S820, the system selects a second thread for the second tenant actor from the pool of available threads. At S830, the dispatcher platform spins a second web assembly module such that execution of the second web assembly is associated with a second web assembly browser sandbox. At S840, the system creates the second tenant actor within the second web assembly browser sandbox to execute the workflow for the second tenant identifier. In this way, actors for the second tenant operate in a completely different sandbox as compared to actors for the first tenant.

Figure 9:
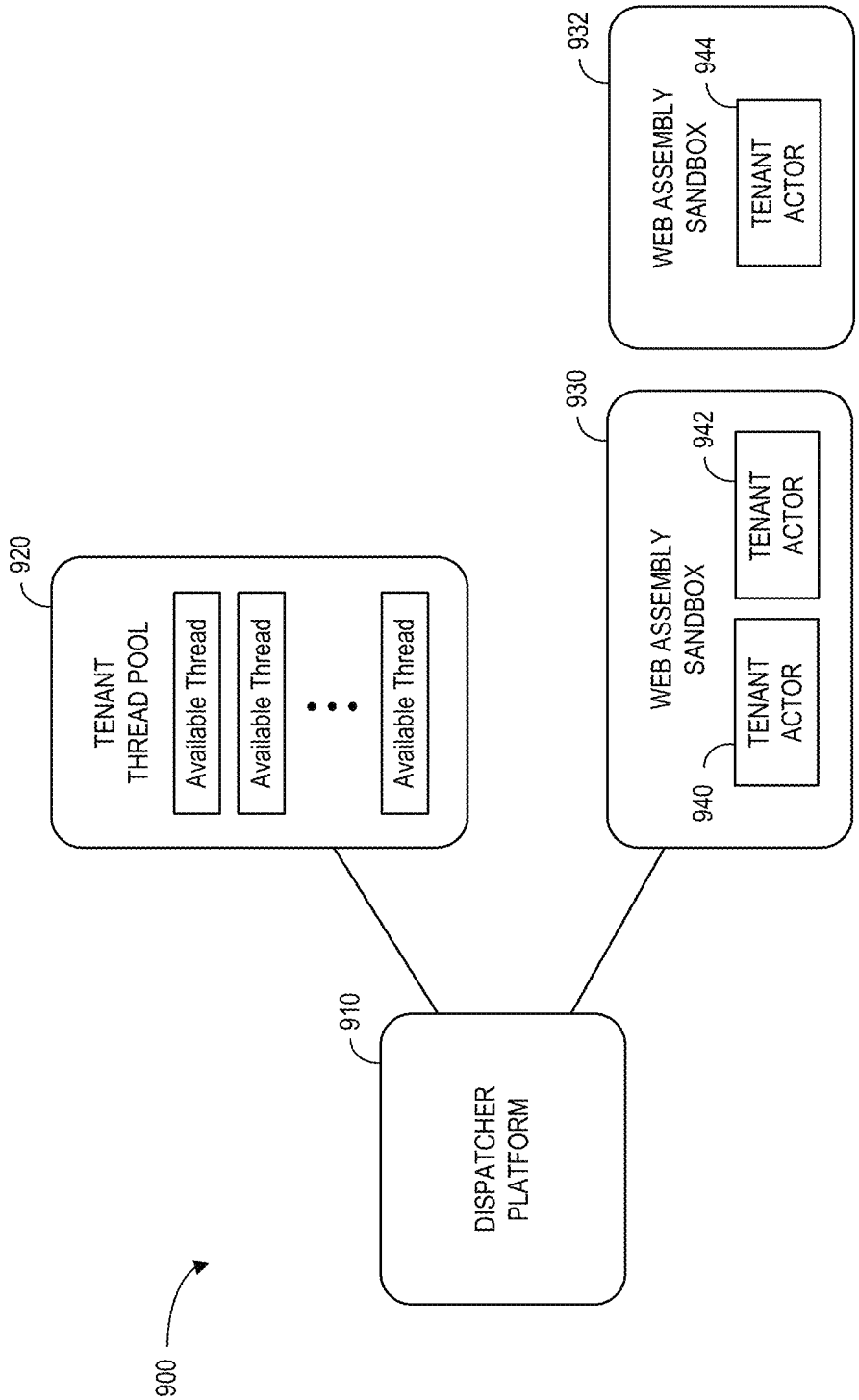
FIG. 9 illustrates a system associated with multiple actors and/or tenants according to some embodiments.

At S850, the system determines that an additional tenant actor is to be created for the first tenant in connection with the workload. At S860, the system selects an additional thread for the additional tenant actor from the pool of available threads. At S870, the additional tenant actor is created within the first web assembly browser sandbox to execute the workflow for the first tenant identifier. That is both the first tenant and the newly created additional tenant may exist together in the same sandbox (because they are both associated with the same tenant identifier). FIG. 9 illustrates a system 900 associated with multiple actors and/or tenants according to some embodiments. Here, a dispatcher platform 910 has created two tenant actors 940, 942 in a single web assembly sandbox 930 (using threads from a tenant thread pool 920). This is because the two actors 940, 942 are associated with the same tenant identifier as in S850 through S870. Moreover, the dispatcher platform 910 has created another web assembly sandbox 932 for another tenant actor 944 associated with a different tenant identifier as in S810 through S840.

Figure 10:
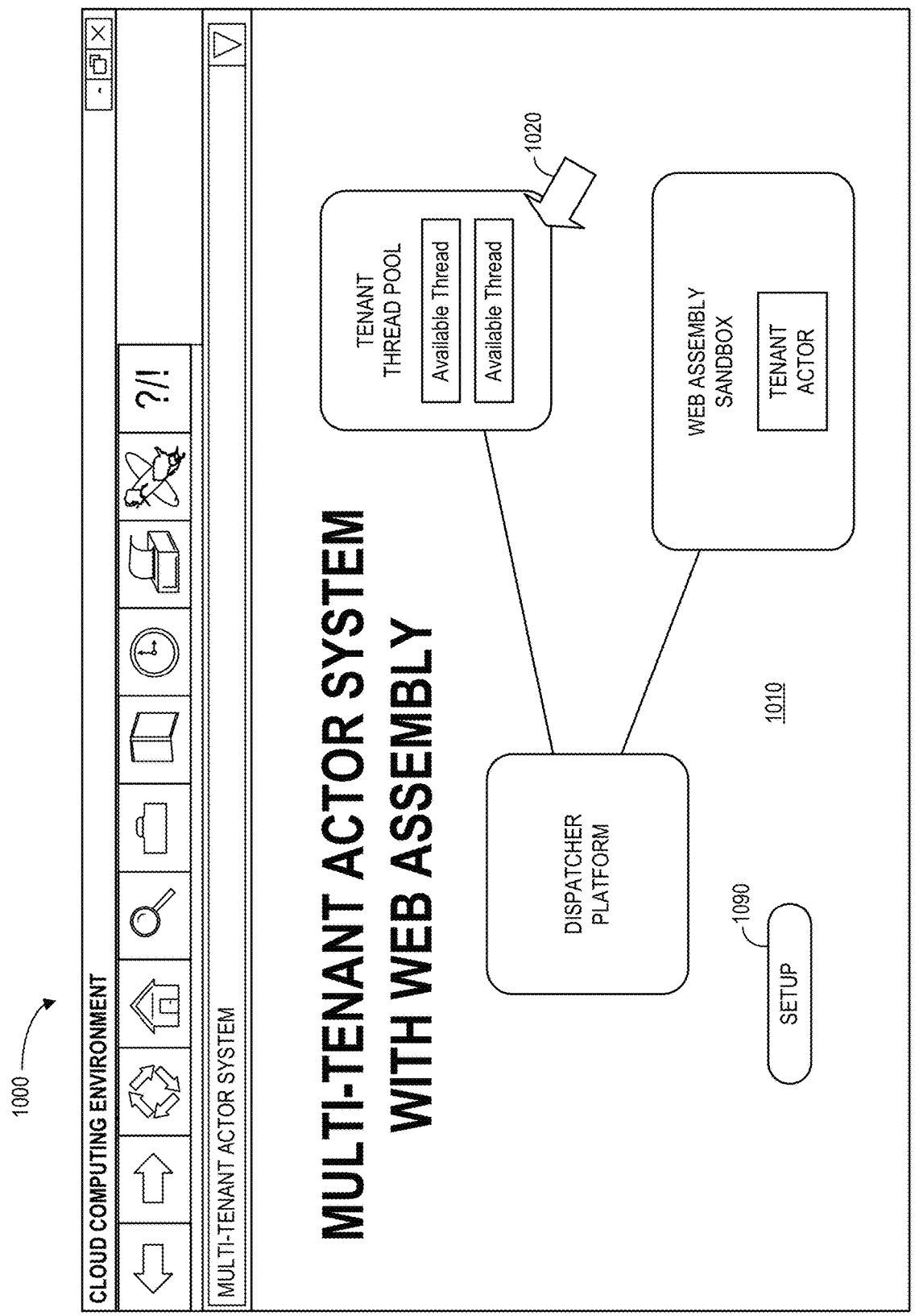
FIG. 10 is a human machine interface display according to some embodiments.

FIG. 10 is a human machine interface display 1000 in accordance with some embodiments. The display 1000 includes a graphical representation 1010 of elements of cloud-based actor framework system for a cloud computing environment (e.g., to securely execute actors for multiple tenants). Selection of an element (e.g., via a touch-screen or computer pointer 1020) may result in display of a pop-up window containing various options (e.g., to adjust rules or logic, assign various devices, etc.). The display 1000 may also include a user-selectable "Setup" icon 1020 (e.g., to configure parameters for cloud management/provisioning (e.g., to alter or adjust processes as described with respect any of the embodiments of FIGS. 2 through 9)).

Figure 11:
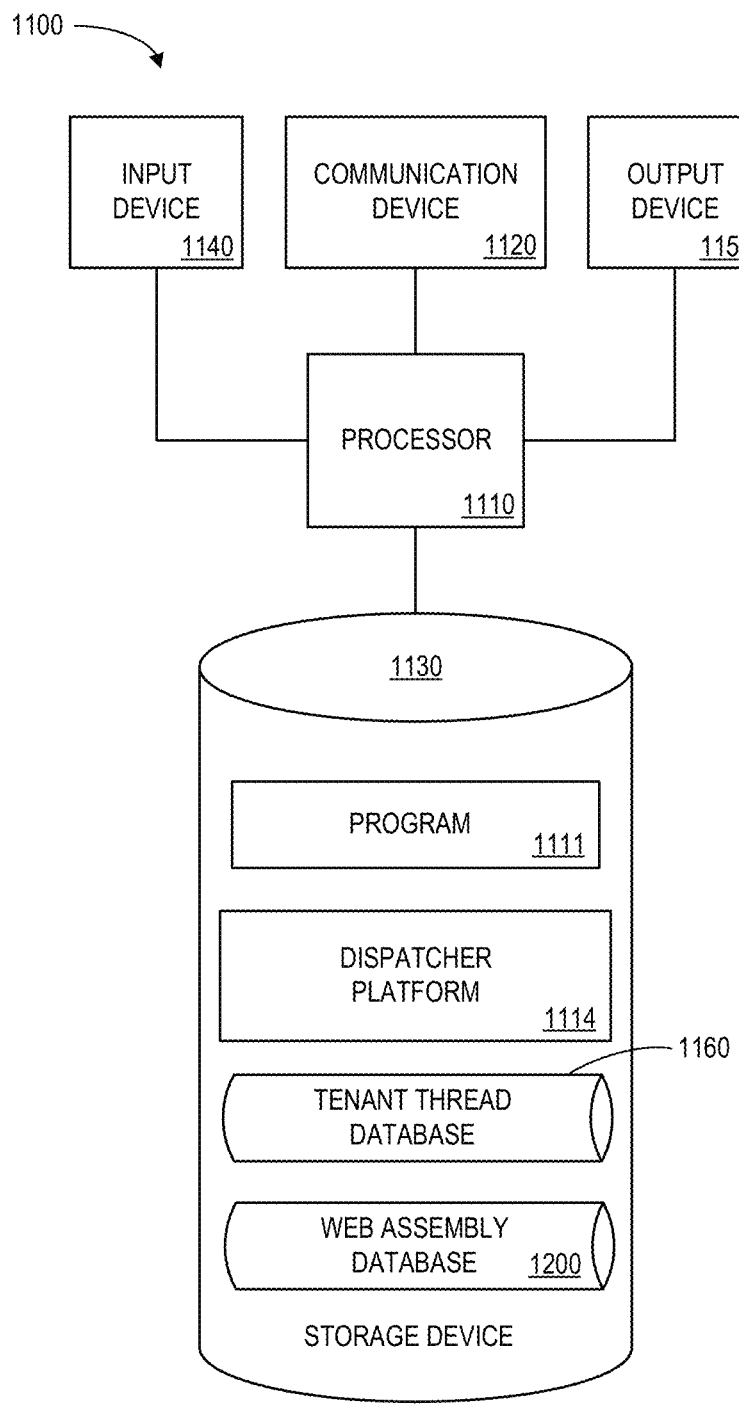
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the system 200 of FIG. 2 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, cloud resource providers, etc. The platform 1100 further includes an input device 1140 (e.g., a computer mouse and/or keyboard to input rules or logic) and/an output device 1150 (e.g., a computer monitor to render a display, transmit recommendations, and/or create data center reports). According to some embodiments, a mobile device and/or PC may be used to exchange information with the platform 1100.

The processor 1110 also communicates with a storage device 1130. The storage device 1130 can be implemented as a single database or the different components of the storage device 1130 can be distributed using multiple databases (that is, different deployment information storage options are possible). The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or dispatcher platform 1114 for controlling the processor 1110. The processor 1110 performs instructions of the programs 1112, 1114, and thereby operates in accordance with any of the embodiments described herein. For example, the processor 1110 may determine that a first tenant actor is to be created for a first tenant in connection with a workload associated with a plurality of tenant identifiers. The first tenant may be, for example, associated with a first tenant identifier. The processor 1110 may then select a first thread for the first tenant actor from a pool of available threads and spin a first web assembly module such that execution of the first web assembly module is associated with a first web assembly browser sandbox. The processor 1110 can then securely create the first tenant actor within the first web assembly browser sandbox to execute the workflow for the first tenant identifier. Similarly, a second web assembly browser sandbox may execute a second tenant actor for a second tenant identifier.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a tenant thread database 1160 and a web assembly database 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
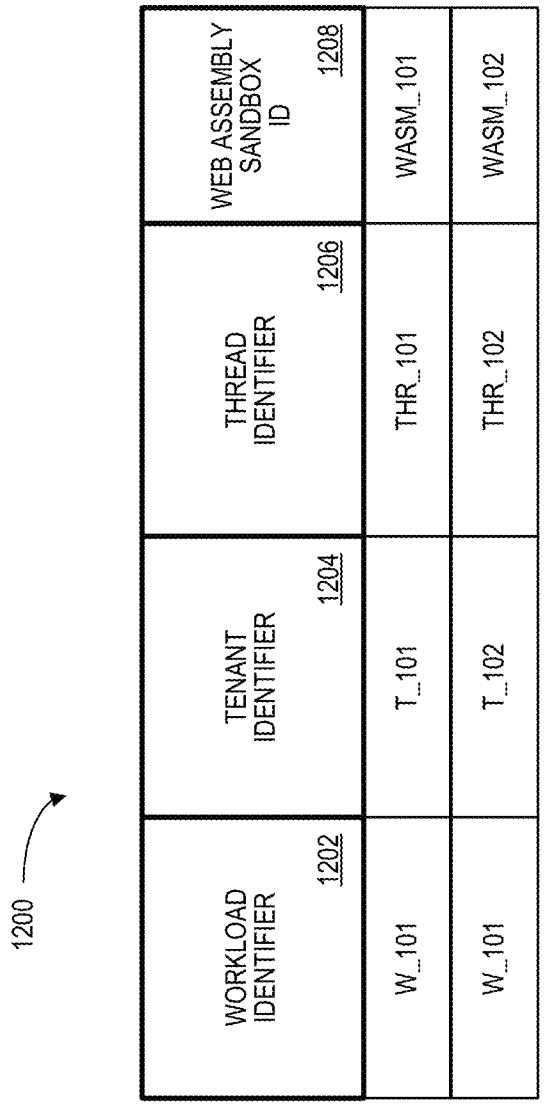
FIG. 12 illustrates a web assembly database in accordance with some embodiments.

Referring to FIG. 12, a table is shown that represents the web assembly database 1200 that may be stored at the platform 1200 according to some embodiments. The table may include, for example, entries mapping cloud resources (e.g., for a cloud provider) that may be utilized by applications. The table may also define fields 1202, 1204, 1206, 1208, for each of the entries. The fields 1202, 1204, 1206, 1208 may, according to some embodiments, specify: a workload identifier 1202, a tenant identifier 1204, a thread identifier 1206, and a web assembly sandbox identifier 1208. The web assembly database 1200 may be created and updated, for example, when a new workload is initiated, a new actor is created, etc. According to some embodiments, the web assembly database 1200 may further store details about each actor (e.g., whether an actor is currently active or deactivated).

The workload identifier 1202 might be a unique alphanumeric label or link that is associated with a particular workload being executed for multiple tenants. The tenant identifier 1204 might identify an organization or enterprise (e.g., and as shown in FIG. 12 multiple tenant identifiers are associated with a single workload "W_101"). The thread identifier 1206 might identify an available thread that was selected from a pool of threads, and the web assembly sandbox identifier 1208 might identify a particular sandbox where an actor is being executed.

Thus, embodiments may provide multi-tenant support for a cloud-based actor computing environment in a secure, automatic, and accurate manner. Moreover, the multiple tenants may operate in separate sandboxes (with access to different memories) improving the security of the system.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
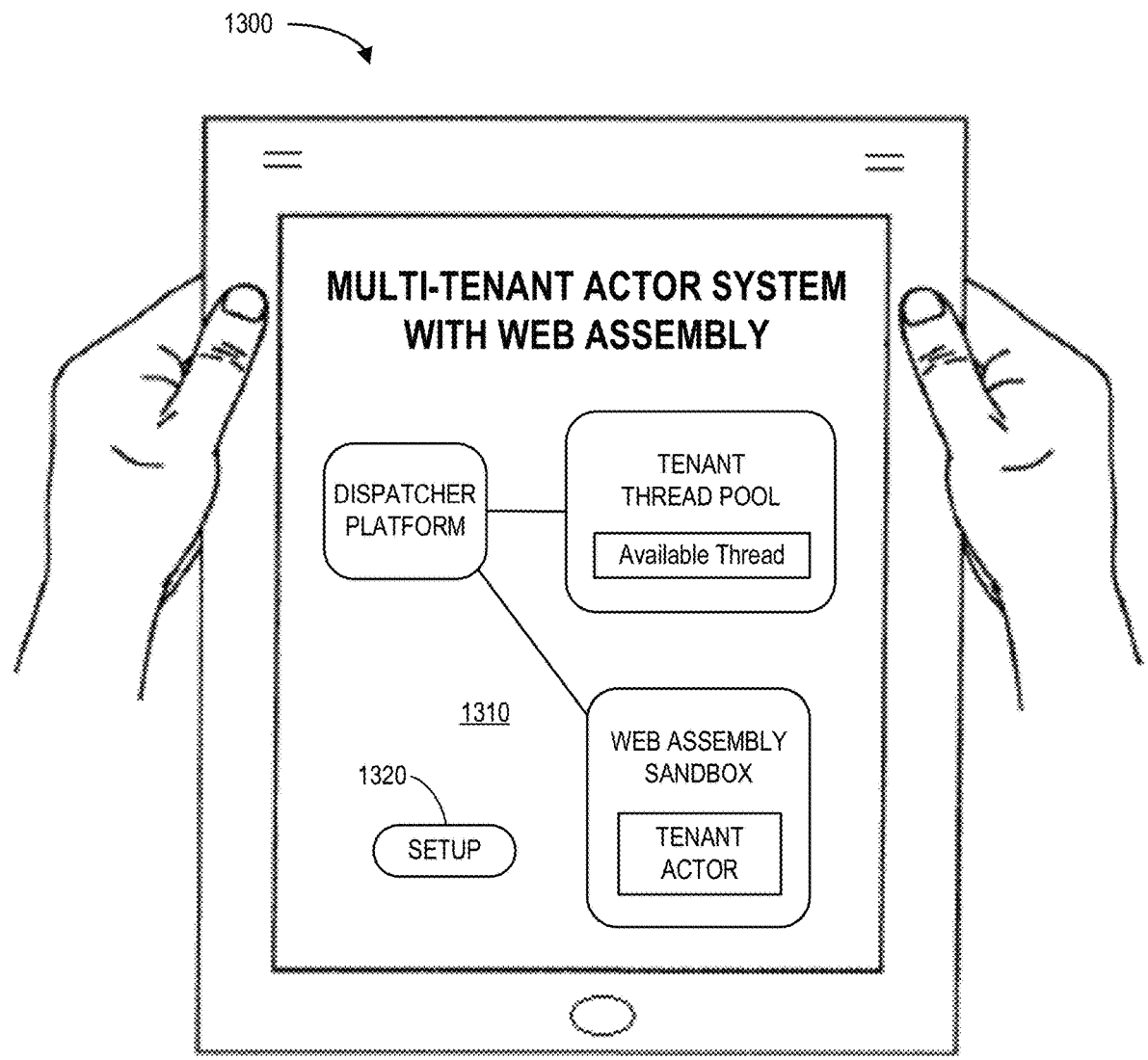
FIG. 13 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 13 shows a tablet computer 1300 rendering a multi-tenant actor system with web assembly display 1310. The display 1310 may, according to some embodiments, be used to view more detailed elements about components of the system (e.g., when a graphical element is selected via a touchscreen) or to configure operation of the system (e.g., to establish new rules or logic for the system via a "Setup" icon 1320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with dispatcher for a cloud-based actor framework, comprising:
    a computer processor, and
    a memory storage device including instructions that when executed by the computer processor enable the system to:
        (i) determine that a first tenant actor is to be created for a first tenant in connection with a workload,
        (ii) select a first thread for the first tenant actor from a pool of available threads,
        (iii) spin a first web assembly module such that execution of the first web assembly module is associated with a first web assembly browser sandbox, and
        (iv) create the first tenant actor within the first web assembly browser sandbox to execute the workflow for the first tenant.

2. The system of claim 1, wherein the dispatcher is further to:
    determine that a second tenant actor is to be created for a second tenant in connection with the workload, select a second thread for the second tenant actor from the pool of available threads,
spin a second web assembly module such that execution of the second web assembly is associated with a second web assembly browser sandbox, and
create the second tenant actor within the second web assembly browser sandbox to execute the workflow for the second tenant.

3. The system of claim 2, wherein the dispatcher is further to:
determine that an additional tenant actor is to be created for the first tenant in connection with the workload,
select an additional thread for the additional tenant actor from a pool of available threads, and
create the additional tenant actor within the first web assembly browser sandbox to execute the workflow for the first tenant.

4. The system of claim 2, wherein the first web assembly browser sandbox is associated with a first memory heap that is not accessible from the second web assembly browser sandbox.

5. The system of claim 2, wherein a system call from the first web assembly browser sandbox is mediated and controlled.

6. The system of claim 2, wherein control flow integrity for the first web assembly browser sandbox is maintained by separating an execution stack from web assembly module memory.

7. The system of claim 2, wherein access to a function for the first web assembly browser sandbox is limited via an index into a function table.

8. A computer-implemented method associated with a cloud-based actor framework, comprising:
determining that a first tenant actor is to be created for a first tenant in connection with a workload;
selecting a first thread for the first tenant actor from a pool of available threads;
spinning, by a dispatcher, a first web assembly module such that execution of the first web assembly module is associated with a first web assembly browser sandbox; and
creating the first tenant actor within the first web assembly browser sandbox to execute the workflow for the first tenant.

9. The method of claim 8, further comprising:
determining that a second tenant actor is to be created for a second tenant in connection with the workload;
selecting a second thread for the second tenant actor from the pool of available threads;
spinning, by the dispatcher, a second web assembly module such that execution of the second web assembly is associated with a second web assembly browser sandbox; and
creating the second tenant actor within the second web assembly browser sandbox to execute the workflow for the second tenant.

10. The method of claim 9, further comprising:
determining that an additional tenant actor is to be created for the first tenant in connection with the workload;
selecting an additional thread for the additional tenant actor from the pool of available threads; and
creating the additional tenant actor within the first web assembly browser sandbox to execute the workflow for the first tenant.

11. The method of claim 9, wherein the first web assembly browser sandbox is associated with a first memory heap that is not accessible from the second web assembly browser sandbox.

12. The method of claim 9, wherein a system call from the first web assembly browser sandbox is mediated and controlled.

13. The method of claim 9, wherein control flow integrity for the first web assembly browser sandbox is maintained by separating an execution stack from web assembly module memory.

14. The method of claim 9, wherein access to a function for the first web assembly browser sandbox is limited via an index into a function table.

15. A non-transitory, computer readable medium having executable instructions stored therein, the medium comprising:
instruction to determine that a first tenant actor is to be created for a first tenant in connection with a workload;
instruction to select a first thread for the first tenant actor from a pool of available threads;
instruction to spin, by a dispatcher, a first web assembly module such that execution of the first web assembly module is associated with a first web assembly browser sandbox; and
instruction to create the first tenant actor within the first web assembly browser sandbox to execute the workflow for the first tenant.

16. The medium of claim 15, further comprising:
instruction to determine that a second tenant actor is to be created for a second tenant in connection with the workload;
instruction to select a second thread for the second tenant actor from the pool of available threads;
instruction to spin, by the dispatcher, a second web assembly module such that execution of the second web assembly is associated with a second web assembly browser sandbox; and
instruction to create the second tenant actor within the second web assembly browser sandbox to execute the workflow for the second tenant.

17. The medium of claim 16, further comprising:
instruction to determine that an additional tenant actor is to be created for the first tenant in connection with the workload;
instruction to select an additional thread for the additional tenant actor from a pool of available threads; and
instruction to create the additional tenant actor within the first web assembly browser sandbox to execute the workflow for the first tenant.

18. The medium of claim 16, wherein the first web assembly browser sandbox is associated with a first memory heap that is not accessible from the second web assembly browser sandbox.

19. The medium of claim 16, wherein a system call from the first web assembly browser sandbox is mediated and controlled.

20. The medium of claim 16, wherein control flow integrity for the first web assembly browser sandbox is maintained by separating an execution stack from web assembly module memory.

* * * * *